United States Patent
Patel et al.

(10) Patent No.: US 10,122,506 B2
(45) Date of Patent: Nov. 6, 2018

(54) SINGLE TTI TRANSMISSION OF CONTROL DATA IN WIRELESS COMMUNICATIONS

(71) Applicant: QUALCOMM Incorporated, San Diego, CA (US)

(72) Inventors: Shimman Arvind Patel, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 14/946,448

(22) Filed: Nov. 19, 2015

(65) Prior Publication Data

US 2016/0182202 A1   Jun. 23, 2016

Related U.S. Application Data (60) Provisional application No. 62/096,402, filed on Dec. 23, 2014.

(51) Int. Cl.
| | |
|---|---|
| *H04L 5/00* | (2006.01) |
| *H04W 72/04* | (2009.01) |
| *H04L 27/34* | (2006.01) |
| *H04L 27/26* | (2006.01) |
| *H04L 25/02* | (2006.01) |

(52) U.S. Cl.
CPC ........ *H04L 5/0048* (2013.01); *H04L 25/0226* (2013.01); *H04L 27/2614* (2013.01); *H04L 27/34* (2013.01); *H04W 72/0406* (2013.01); *H04W 72/0446* (2013.01); *H04W 72/0453* (2013.01)

(58) Field of Classification Search
CPC ............... H04L 5/0048; H04L 25/0226; H04L 27/2614; H04L 27/34; H04W 72/0446; H04W 72/0453; H04W 72/0406
See application file for complete search history.

(56) References Cited

U.S. PATENT DOCUMENTS

| | | | |
|---|---|---|---|
| 6,567,374 B1 * | 5/2003 | Bohnke .................. | H04L 5/023 370/203 |
| 9,642,119 B2 * | 5/2017 | Pajukoski ............. | H04W 72/04 |
| 9,648,598 B2 * | 5/2017 | Takeda ............... | H04W 72/0413 |
| 9,648,604 B2 * | 5/2017 | Papasakellariou .. | H04W 72/042 |
| 9,660,851 B2 * | 5/2017 | Hadani ............... | H04L 27/2627 |
| 9,660,853 B2 * | 5/2017 | Shimomura ........ | H04L 27/2637 |

(Continued)

FOREIGN PATENT DOCUMENTS

WO   WO-2008/133467 A1   11/2008

OTHER PUBLICATIONS

International Search Report and Written Opinion—PCT/US2015/061963—ISA/EPO—dated Feb. 19, 2016. 12 Total Pages.

*Primary Examiner* — Tejis Daya
(74) *Attorney, Agent, or Firm* — Anthony R. Morris (57) ABSTRACT

Various aspects described herein relate to wireless communications, including generating a waveform including a combined reference signal and control data signal, the reference signal and the control data signal being phase offset from one another in the waveform, and transmitting the waveform on one resource block in a transmission time interval having a duration that is less than a subframe.

26 Claims, 7 Drawing Sheets

(56) References Cited

U.S. PATENT DOCUMENTS

| | | | |
|---|---|---|---|
| 2007/0280365 A1* | 12/2007 | Seki | H04L 5/0046 375/260 |
| 2008/0268860 A1* | 10/2008 | Lunttila | H04L 1/1887 455/450 |
| 2008/0310540 A1* | 12/2008 | Tiirola | H04J 13/00 375/267 |
| 2010/0067461 A1* | 3/2010 | Kwak | H04L 1/0026 370/329 |
| 2010/0074343 A1* | 3/2010 | Gaal | H04L 27/261 375/259 |
| 2010/0135360 A1* | 6/2010 | Kwak | H04L 5/0016 375/135 |
| 2010/0177669 A1* | 7/2010 | Suo | H04L 1/0027 370/280 |
| 2010/0272019 A1* | 10/2010 | Papasakellariou | H04B 7/0417 370/328 |
| 2011/0170504 A1* | 7/2011 | Xu | H04L 5/00 370/329 |
| 2011/0200000 A1* | 8/2011 | Nishio | H04J 11/00 370/329 |
| 2013/0039299 A1* | 2/2013 | Papasakellariou | H04L 1/0073 370/329 |
| 2014/0036830 A1* | 2/2014 | Arnott | H04B 1/7143 370/329 |
| 2014/0233506 A1* | 8/2014 | Papasakellariou | H04L 1/06 370/329 |
| 2014/0286255 A1* | 9/2014 | Nam | H04L 1/1861 370/329 |

* cited by examiner

SINGLE TTI TRANSMISSION OF CONTROL DATA IN WIRELESS COMMUNICATIONS

CLAIM OF PRIORITY UNDER 35 U.S.C. § 119

The present Application for Patent claims priority to Provisional Application No. 62/096,402 entitled "SINGLE SYMBOL TRANSMISSION OF CONTROL DATA IN WIRELESS COMMUNICATIONS" filed Dec. 23, 2014, which is assigned to the assignee hereof and hereby expressly incorporated by reference herein.

BACKGROUND

Described herein are aspects generally related to communication systems, and more particularly, to transmitting control data in wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, a plurality of UEs served by a particular evolved Node B (eNB) may be scheduled resources for communicating with the eNB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes generating a waveform including a combined reference signal and control data signal. The reference signal and the control data signal are phase offset from one another in the waveform. The method further includes transmitting the waveform on one resource block in a transmission time interval (TTI) having a duration that is less than a subframe.

In other aspects, a user equipment for wireless communication is provided. The user equipment includes a transceiver, at least one processor communicatively coupled with the transceiver, via a bus, and a memory communicatively coupled with the at least one processor and/or the transceiver via the bus. The at least one processor may be configured to generate a waveform including a combined reference signal and control data signal. The reference signal and the control data signal are phase offset from one another in the waveform. The at least one processor may be further configured to transmit, via the transceiver, the waveform on one resource block in a TTI having a duration that is less than a subframe.

In another example, a user equipment for wireless communication is provided. The user equipment includes means for generating a waveform including a combined reference signal and control data signal. The reference signal and the control data signal are phase offset from one another in the waveform. The user equipment further includes means for transmitting the waveform on one resource block in a TTI having a duration that is less than a subframe.

In other aspects, a computer-readable storage medium including computer-executable code for wireless communications is provided. The code includes code for generating a waveform including a combined reference signal and control data signal. The reference signal and the control data signal are phase offset from one another in the waveform. The code further includes code for transmitting the waveform on one resource block in a transmission time interval (TTI) having a duration that is less than a subframe.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to transmitting control data (e.g., uplink control information (UCI), downlink control information (DCI), etc.) in wireless technologies targeting lower latency. For example, a lower latency wireless technology may be based on a relatively shorter transmission time interval (TTI) than an existing (e.g., legacy) wireless technology. In one specific example, in long term evolution (LTE), which is based on a TTI of 1 millisecond (ms) (e.g., corresponding to 1 subframe), a lower latency wireless technology referred to as ultra low latency (ULL) LTE can be defined as based on a TTI having a duration less than a subframe (e.g., a duration of one symbol, or two symbols, or a subframe slot, etc.). In this regard, a lower latency in communications is achieved by the shorter, more frequent TTI. To additionally lessen signaling resources used in such lower latency wireless technologies, a single transmission of a combined signal that includes a control data signal along with a reference signal for decoding the control data signal over one resource block in a TTI (e.g., a one symbol, or two symbol, or slot, etc. duration TTI) is described herein. Accordingly, an entity receiving the single transmission of the combined signal can use the reference signal in decoding the control data signal, and the combined signal is sent and received in a single TTI.

Figure 1:
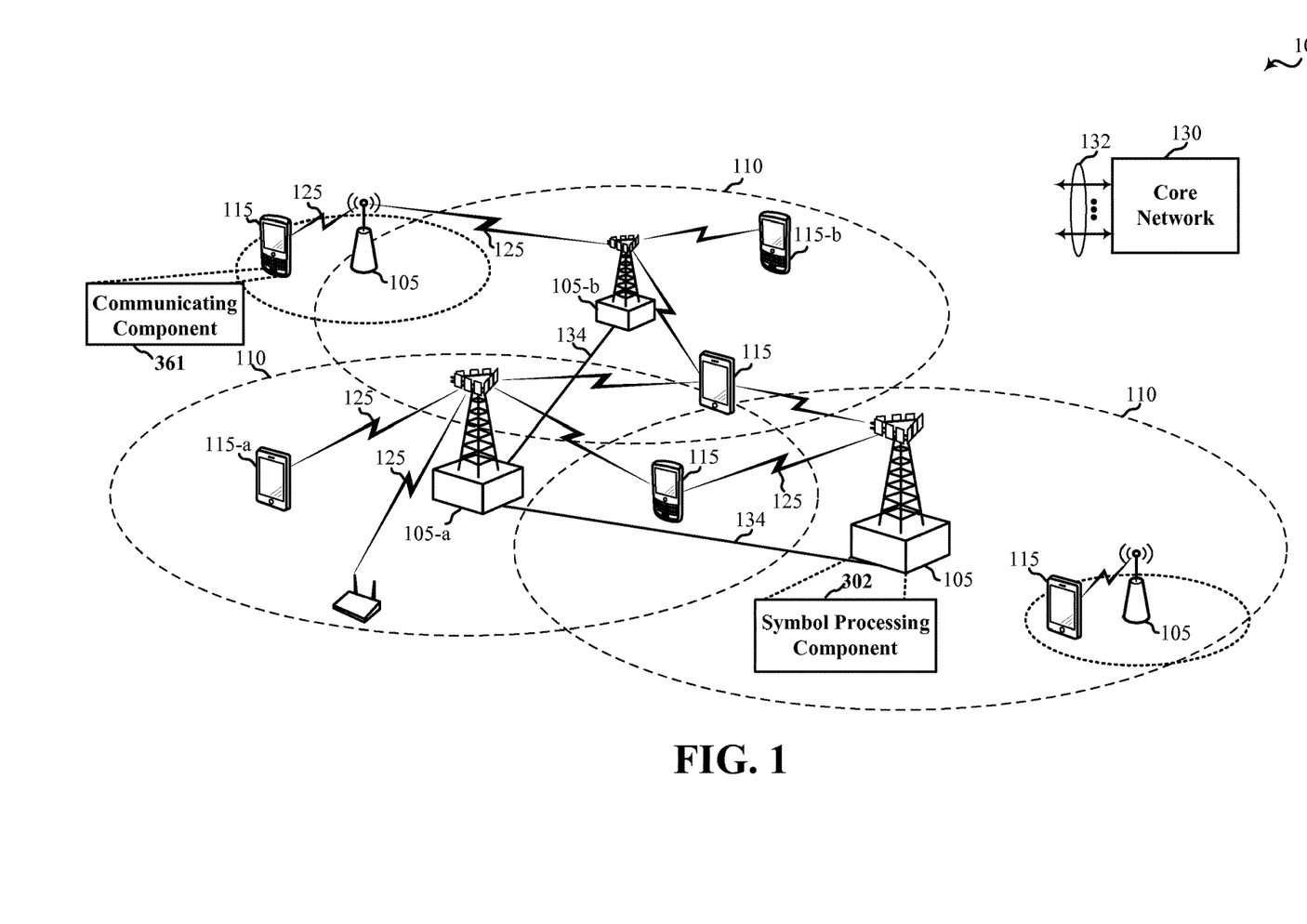
FIG. 1 shows a block diagram conceptually illustrating an example of a telecommunications system, in accordance with aspects described herein.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a symbol processing component 302 configured to decode a combined signal, including a reference signal and a control data signal, received in a single symbol, or other duration (e.g., TTI) less than a subframe, from one or more UEs 115, as described further herein. Similarly, one or more of UEs 115 may include a communicating component 361 configured to generate a combined signal, including a reference signal and a control data signal, for transmitting over a single symbol, or other duration (e.g., TTI) less than a subframe, to the access points 105. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-*a* may communicate with access point 105-*a* on both a first hierarchical layer that supports first layer transmissions using a first TTI (also referred to herein as "legacy communications" or "legacy wireless technology") and a second hierarchical layer that supports second layer transmissions using a second TTI, which may be shorter than the first TTI (also referred to herein as "ULL communications" or "lower latency wireless technology").

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Access point 105-*b* and UE 115-*b* may communicate on the second hierarchical layer through transmissions of subframes of the second subframe type. Access point 105-*b* may transmit communications related to the first or second hierarchical layer only or may transmit communications for both the first and second hierarchical layers. Where an access point 105-*b* supports both the first and second hierarchical layers, communicating component 361 can be configured to prioritize communications received from the access point 105-*b* that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, evolved Node B (eNB), Home NodeB, a Home eNB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A and/or ULL LTE network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, small cell eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
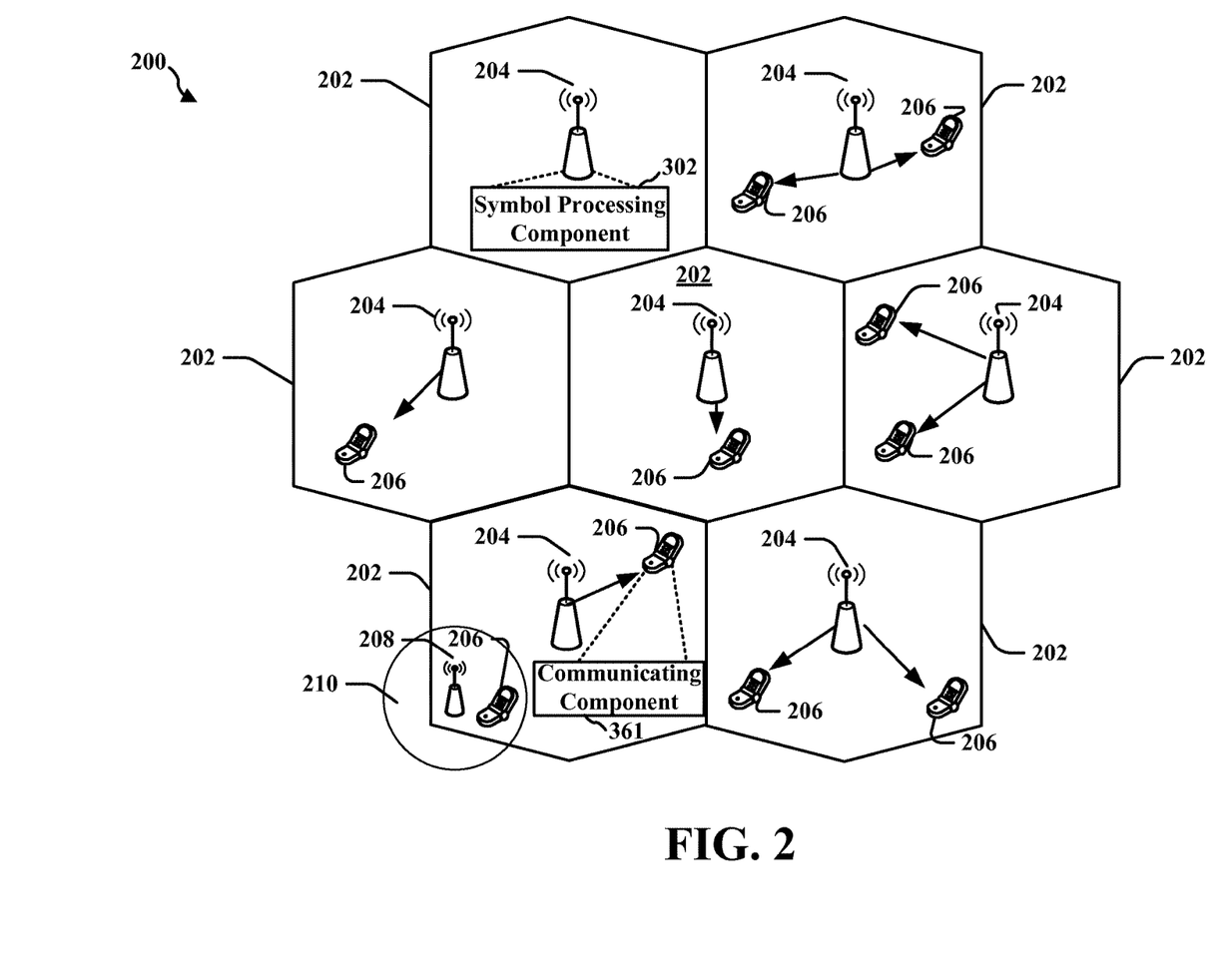
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNB 208 may include a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 (or small cell eNBs 208) may include a symbol processing component 302 configured to decode a combined reference signal and control data signal transmission received in a single symbol, or other duration less than a subframe, from one or more UEs 206, as described further herein. Similarly, one or more of UEs 206 may include a communicating component 361 configured to generate a combined reference signal and control data signal for transmitting over a single symbol, or other duration less than a subframe, to the eNB(s) 204/208. There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
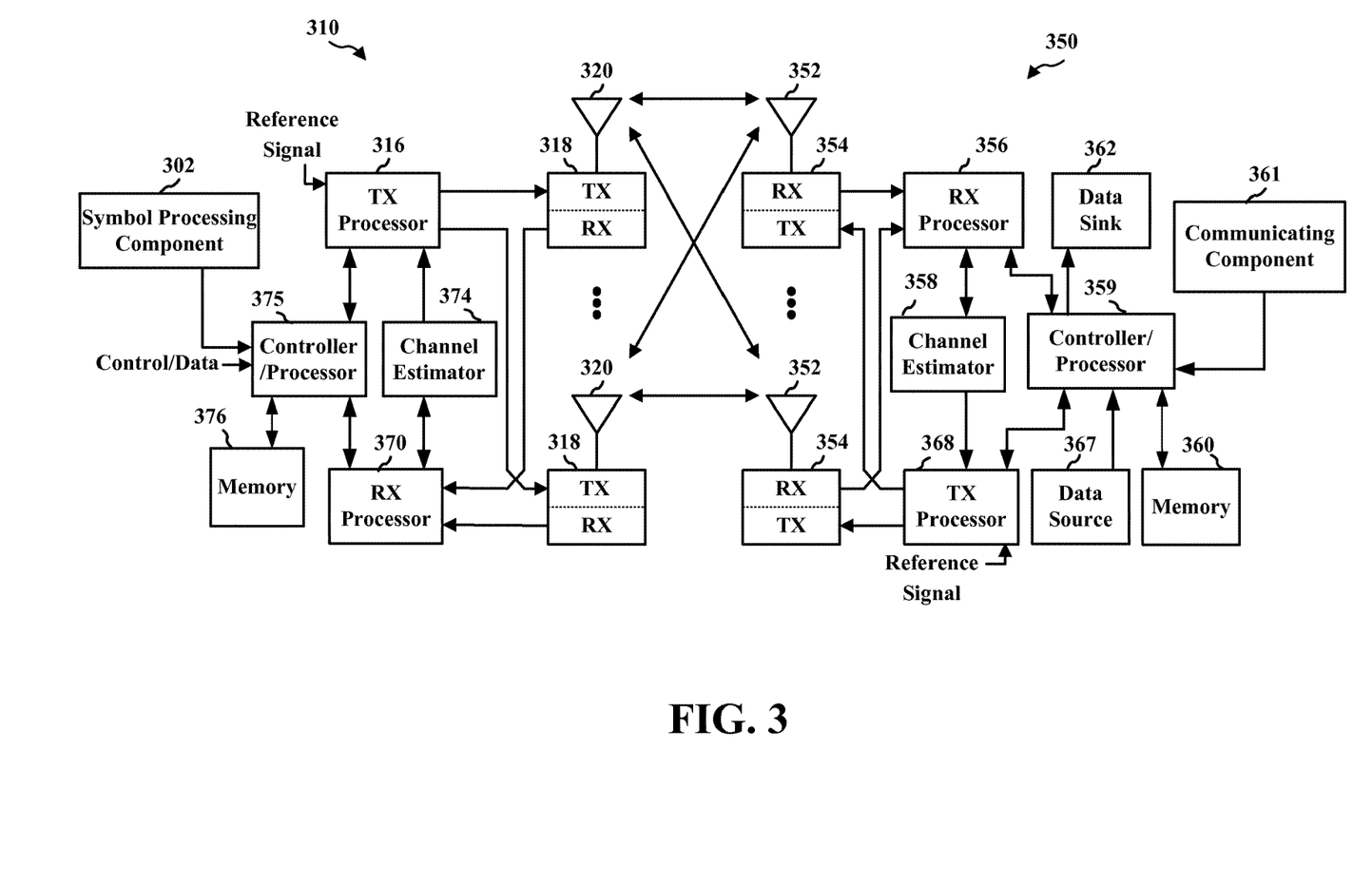
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARQ) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include a symbol processing component 302 configured to decode a combined signal, including a reference signal and a control data signal, received in a single symbol, or other duration less than a subframe, from one or more UEs 350, as described further herein. Though symbol processing component 302 is shown as coupled to controller/processor 375, it is to be appreciated that symbol processing component 302 can also be coupled to other processors (e.g., RX processor 370, TX processor 316, etc.) and/or memory 376, and/or implemented by the one or more processors 316, 370, 375 and/or memory 376 to perform actions described herein At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal may include separate OFDM symbol streams for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 configured to generate a combined signal, including a reference signal and a control data signal, for transmitting over a single symbol, or other duration less than a subframe, to the eNB 310. Though communicating component 361 is shown as coupled to controller/processor 359, it is to be appreciated that communicating component 361 can also be coupled to other processors (e.g., RX processor 356, TX processor 368, etc.) and/or memory 360, and/or implemented by the one or more processors 356, 359, 368 and/or memory 360 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
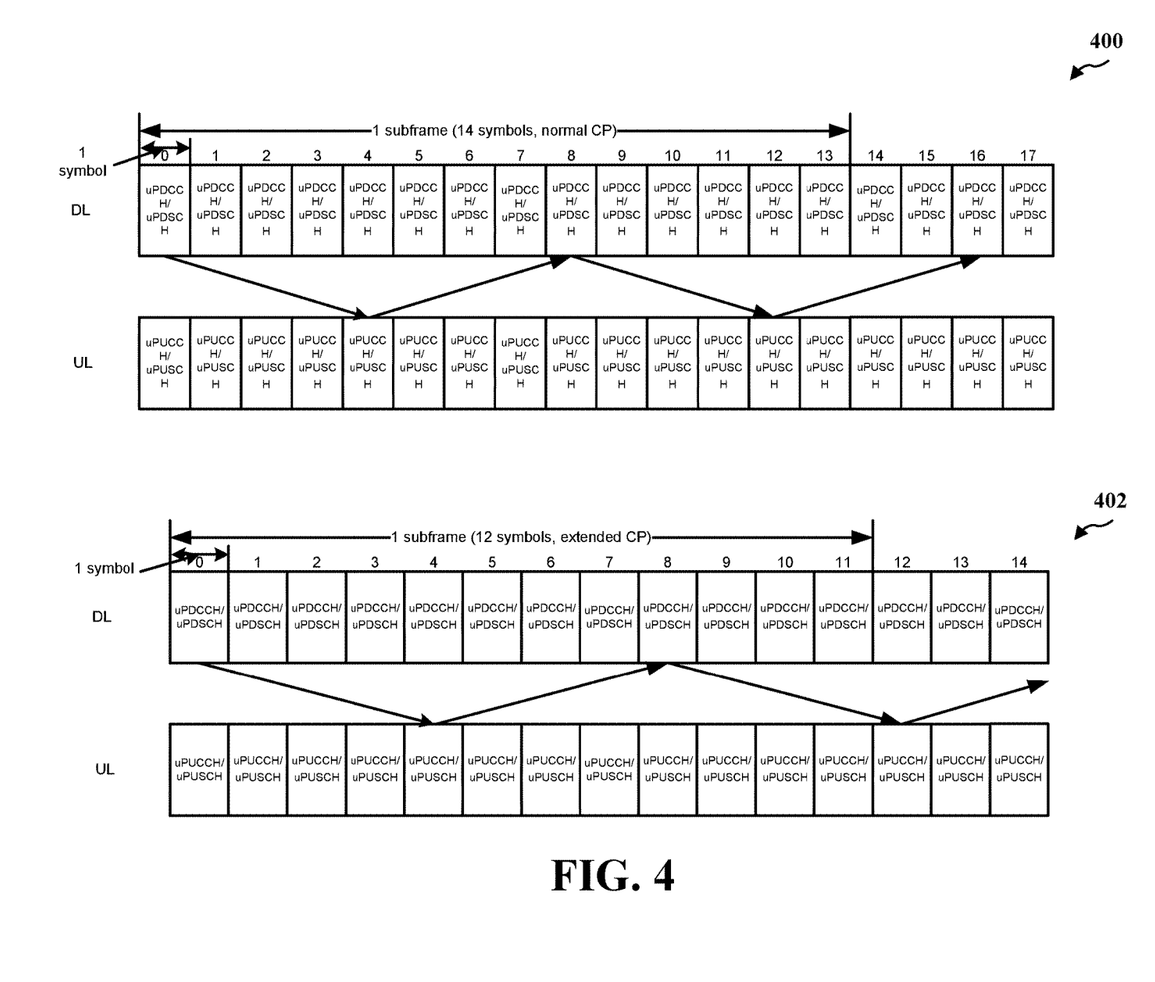
FIG. 4 is a diagram illustrating example timelines for uplink bandwidth allocation.

FIG. 4 is a diagram illustrating non-limiting examples of a ULL timelines 400, 402, with time extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. It is to be appreciated, in other examples, that a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Thus, in one example, the HARQ feedback sent in symbol 4 may include a combined signal, including a reference signal and a control data signal, transmitted in the single symbol 4, as described further herein.

Figure 5:
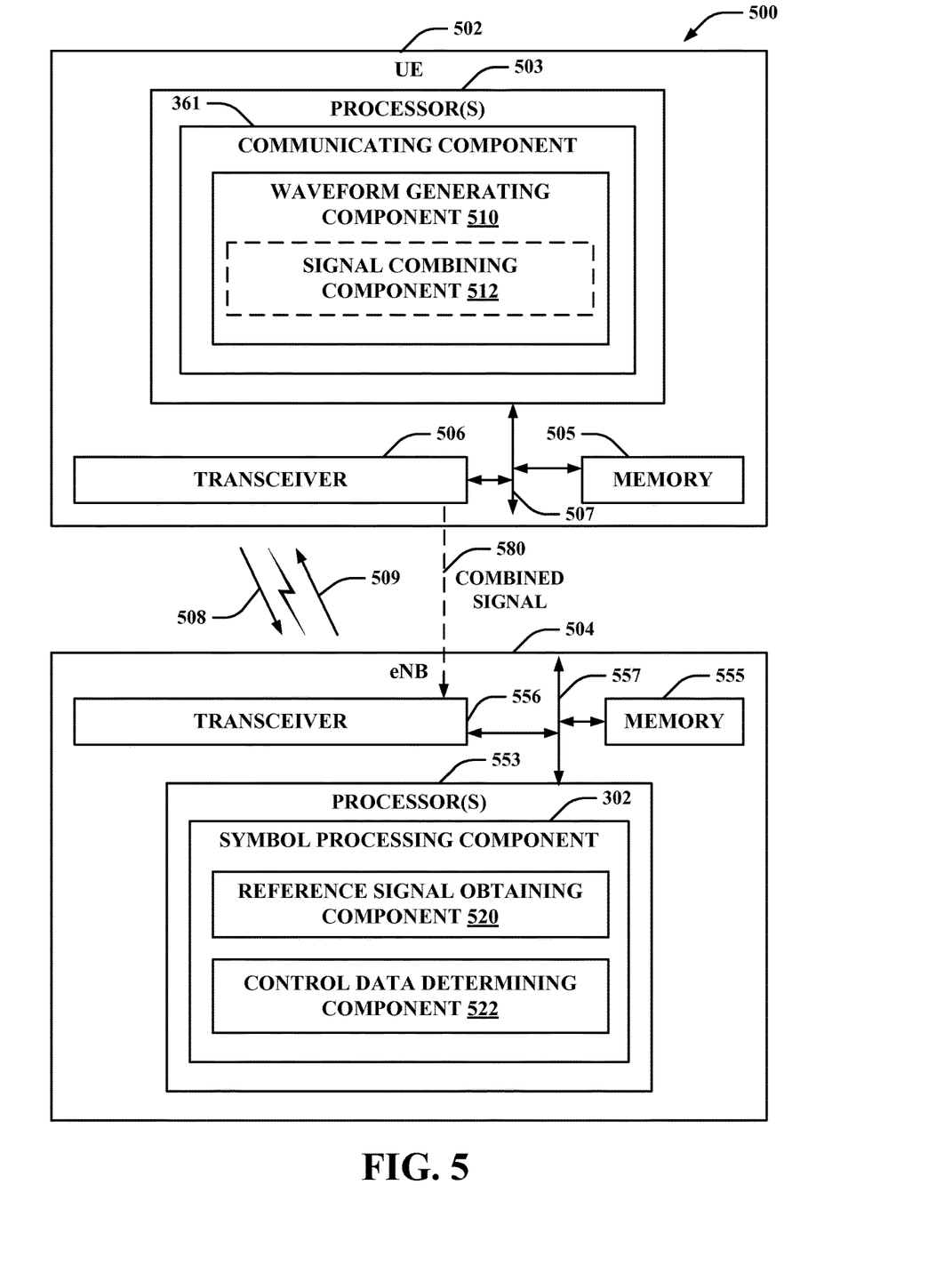
FIG. 5 is a diagram illustrating an example system for communicating a combined reference signal and control data signal in accordance with aspects described herein.
Figure 6:
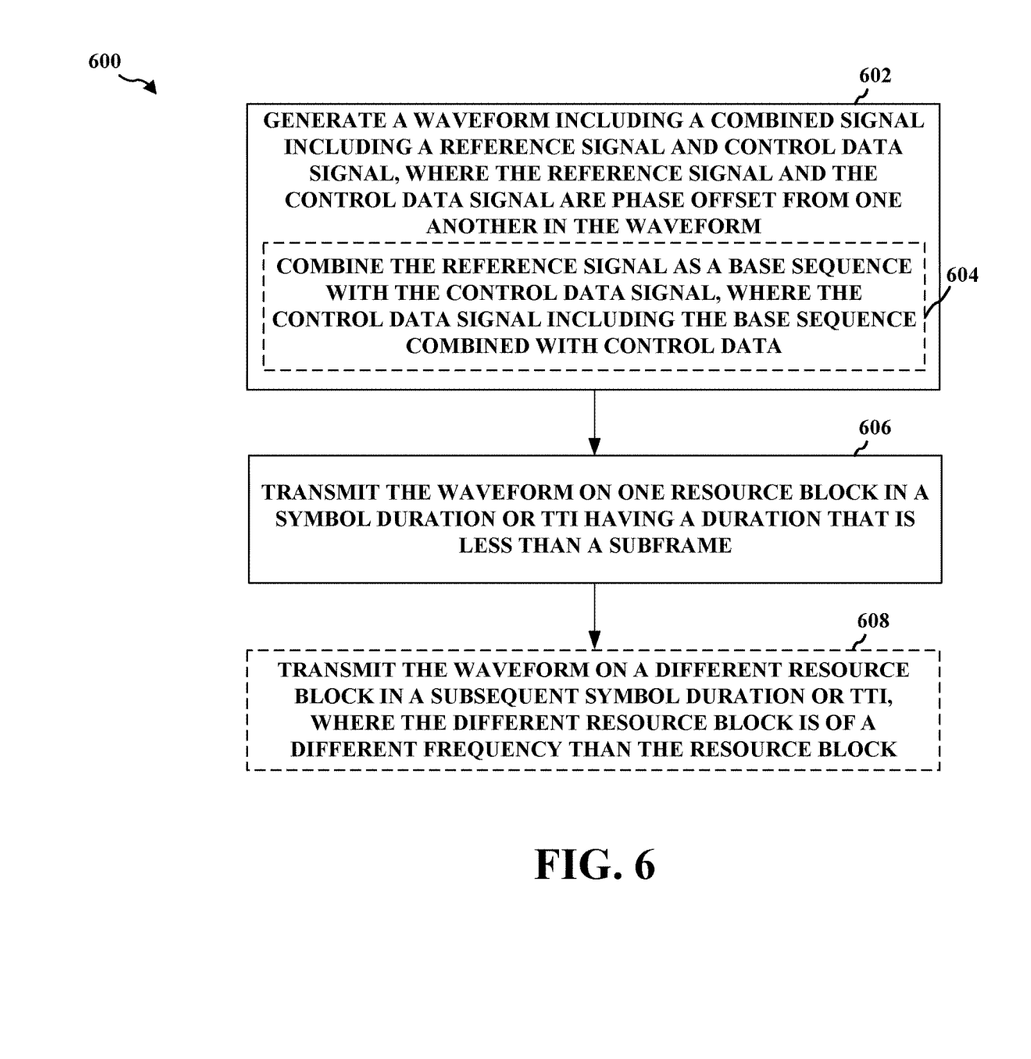
FIG. 6 is a flow chart of an example method for transmitting a combined reference signal and control data signal.
Figure 7:
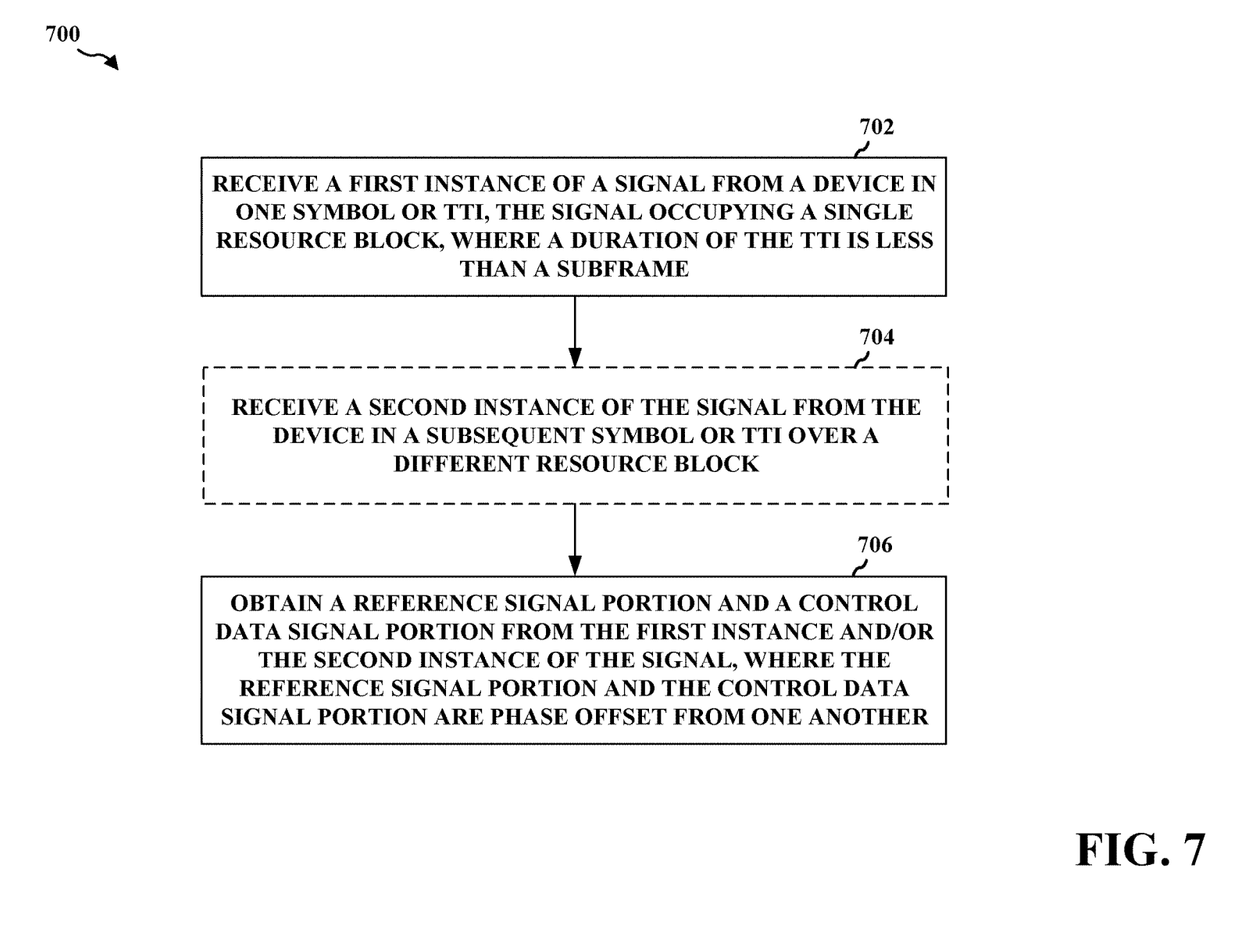
FIG. 7 is a flow chart of an example method for receiving a combined reference signal and control data signal.

Referring to FIGS. 5-7, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6 and 7 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 5 illustrates an example system 500 for communicating combined reference and control data signals over a resource block in a single symbol duration. System 500 includes a UE 502 that communicates with an eNB 504 to access a wireless network, examples of which are described in FIGS. 1-3 (e.g., access points 105, eNB 204, 208, eNB 310, UEs 115, 206, 350, etc.), above. In an aspect, eNB 504 and UE 502 may have established one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources. As described further herein, for example, UE 502 may communicate a combined signal 580 to the eNB 504, where the combined signal 580 includes a reference signal and control data phase offset from one another (e.g., using different phases that may be selected from a plurality of phases defined for a radio access technology where one phase subtracted from the other is even and not equal to zero) to allow the eNB 504 to distinguish the reference signal and use the reference signal to decode the control data. In addition, for example, UE 502 can transmit the combined signal 580 based on a lower latency (e.g., ULL) timeline (e.g., a timeline having a TTI that is less than a subframe in duration, such as the timelines 400, 402 in FIG. 4).

In an aspect, UE 502 may include one or more processors 503 and/or a memory 505 that may be communicatively coupled, e.g., via one or more buses 507, and may operate in conjunction with or otherwise implement a communicating component 361 for communicating with eNB 504 such to transmit uplink signals 508 thereto and/or receive downlink signals 509 therefrom based on a ULL timeline (e.g., a timeline having a TTI that is less than a subframe in duration, such as the timelines 400, 402 in FIG. 4). For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a waveform generating component 510 for generating a waveform that is a combined signal including a reference signal and a control data signal for transmitting to one or more network entities. In an aspect, for example, waveform generating component 510 may include hardware (e.g., one or more processor modules of the one or more processors 503) and/or computer-readable code or instructions stored in memory 505 and executable by at least one of the one or more processors 503 to perform the specially configured waveform generating operations described herein. Further, for instance, the one or more processors 503 and/or memory 505 may execute actions or operations defined by a signal combining component 512 for combining the reference signal and control data signal to generate the waveform. In an aspect, for example, signal combining component 512 may include hardware (e.g., one or more processor modules of the one or more processors 503) and/or computer-readable code or instructions stored in memory 505 and executable by at least one of the one or more processors 503 to perform the specially configured signal combining operations described herein.

Similarly, in an aspect, eNB 504 may include one or more processors 553 and/or a memory 555 that may be communicatively coupled, e.g., via one or more buses 557, and may operate in conjunction with or otherwise implement a symbol processing component 302 for receiving a combined signal from the UE 502 over a symbol or other TTI that is less than a subframe in duration (e.g., according to a ULL timeline having a TTI that is less than a subframe in duration, such as the timelines 400, 402 in FIG. 4). For example, the various functions related to symbol processing component 302 may be implemented or otherwise executed by one or more processors 553 and, in an aspect, can be executed by a single processor, while in other aspects, different ones of the functions may be executed by a combination of two or more different processors, as described above. It is to be appreciated, in one example, that the one or more processors 553 and/or memory 555 may be configured as described in examples above with respect to the one or more processors 503 and/or memory 505 of UE 502.

In an example, the one or more processors 553 and/or memory 555 may execute actions or operations defined by symbol processing component 302 or its subcomponents. For instance, the one or more processors 553 and/or memory 555 may execute actions or operations defined by a reference signal obtaining component 520 for obtaining a reference signal from a UE in a resource block in a symbol duration. In an aspect, for example, reference signal obtaining component 520 may include hardware (e.g., one or more processor modules of the one or more processors 553) and/or computer-readable code or instructions stored in memory 555 and executable by at least one of the one or more processors 553 to perform the specially configured signal obtaining operations described herein. Further, for instance, the one or more processors 553 and/or memory 555 may execute actions or operations defined by a control data determining component 522 for decoding control data received in the resource block in the symbol duration based at least in part on the reference signal. In an aspect, for example, control data determining component 522 may include hardware (e.g., one or more processor modules of the one or more processors 553) and/or computer-readable code or instructions stored in memory 555 and executable by at least one of the one or more processors 553 to perform the specially configured control data determining operations described herein.

It is to be appreciated that transceivers 506, 556 may be configured to transmit and receive wireless signals through one or more antennas, an RF front end, one or more transmitters, and one or more receivers. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

FIG. 6 illustrates an example method 600 for transmitting (e.g., by a UE 502) a combined signal that can include a reference signal and a control data signal in one TTI. At Block 602, the UE 502 can generate a waveform including a combined signal including a reference signal and control data signal, where the reference signal and the control data signal are phase offset from one another in the waveform. In an aspect, waveform generating component 510 (FIG. 5), e.g., in conjunction with one or more processors 503 and/or memory 505, can generate the waveform including the combined signal (e.g., combined signal 580) including a reference signal and control data signal, where the reference signal and the control data signal are phase offset from one another in the waveform. In one example, waveform generating component 510 can generate the combined signal to report the control data to eNB 504. For instance, eNB 504 can transmit communications to UE 502 over downlink resources assigned to the UE 502 (e.g., in one or more TTIs), and UE 502 can report feedback for the communications to the eNB 504 (e.g., in one or more subsequent TTIs, which can be a configured number of TTIs following the TTI over which the communications are received in the downlink resources), which may indicate an acknowledgement (ACK) or non-acknowledgement (NACK) of receiving and/or properly decoding the communications. In this regard, for example, the feedback can include HARQ feedback and/or may include other control data. In one example, waveform generating component 510 can combine the reference signal and control data signal using a different phase offset for each signal, as described further herein.

In addition, for example, waveform generating component 510 may phase offset the reference signal and control data signal based on selected phase offsets defined for a radio access technology, as described below, such that the difference between the selected phase offsets is even and not equal to zero. For example, waveform generating component 510 may select a phase offset (also referred to as cyclic shift) for each of the reference signal and the control data signal from a set of available phase offsets defined for a corresponding RAT (e.g., LTE). Using a different phase offset can allow a receiver of the combined signal 580 to differentiate the reference signal and the control data signal (e.g., by performing an IFFT, inverse discrete Fourier transform IDFT, etc. of the received combined signal 580 to determine the associated channel responses separate in the time domain).

In one example, in generating the waveform at Block 602, the UE 502 may optionally, at Block 604, combine the reference signal as a base sequence with the control data signal. In such an aspect, the control data signal may include the base sequence combined with control data. In an aspect, signal combining component 512, e.g., in conjunction with one or more processors 503 and/or memory 505, may combine the reference signal as a base sequence with the control data signal. In such an aspect, the control data signal may include the base sequence combined with control data. In a specific example, waveform generating component 510 can generate or select a base sequence to utilize for the combined signal, where the base sequence can correspond to the reference signal portion of the combined signal. A base sequence can refer to a sequence defined for transmitting reference signals in a radio access technology (e.g., one or more Zadoff-Chu sequences for demodulation reference signals in LTE). In a specific example (e.g., in LTE or lower latency LTE, such as ULL LTE), the base sequence can be 12 OFDM symbols in length. In addition, for example, waveform generating component 510 can generate the control data signal as the same base sequence combined with the control data (e.g., the base sequence multiplied by a representation of the control data), which may be modulated using a QPSK constellation, a 16-quadrature amplitude modulation (16-QAM), etc.

In one specific example, waveform generating component 510 can receive or otherwise generate a QPSK constellation, 16-QAM, etc. representative of the control data, which can represent a 2 bit transmission. For example, the 2 bits can correspond to HARQ feedback for downlink communications received at the UE 502 (e.g., from the eNB 504), and/or other control data that can occupy the 2 bits. Accordingly, waveform generating component 510 can generate the reference signal as the base sequence and the control data signal as the base sequence combined with the QPSK constellation, 16-QAM, etc. used to modulate the control data, and signal combining component 512 may combine the signals to generate the combined signal (e.g., combined signal 580) for transmission over one resource block in a single TTI (e.g., of a symbol duration, two symbol duration, slot duration, etc.). In a specific example, the waveform can be represented as:

$$S(n) = r_{u1}(n)e^{j2\pi(\alpha 1)n/12} + d(m) \cdot r_{u1}(n)e^{j2\pi(\alpha 2)n/12}$$

where $r_{u1}(n)e^{j2\pi(\alpha 1)n/12}$ can represent the reference signal, and $d(m) \cdot r_{u1}(n)e^{j2\pi(\alpha 2)n/12}$ can represent the control data signal. Further, in this example, $r_{u1}$ can represent the base sequence, $\alpha 1$ and $\alpha 2$ can represent the phase offset of the reference signal and the control data signal, which can be chosen from a plurality of phase offsets defined for the RAT as described, respectively, d(m) can represent the QPSK constellation, 16-QAM, etc, n can represent the tone number (e.g., an index of the frequency tone corresponding to the resource block over which the signal is transmitted, which may be from 0-11 in LTE), and m can represent the OFDM symbol number (e.g., an index of the OFDM symbol within a subframe). In an example, waveform generating component 510 can select or can otherwise be configured with $\alpha 1$ and $\alpha 2$ having different values chosen from a number of phases (e.g., 12 phases or values of $\alpha$, as defined for physical uplink control channel (PUCCH) and/or uplink demodulation reference signals (DM-RS) in LTE in 3GPP Technical Specification 36.211), where the selection of the phase offsets is determined such that abs($\alpha 1$-$\alpha 2$) is even and not equal to 0. Using the QPSK constellation, 16-QAM, etc. in this regard may result in the combined signal exhibiting a decreased PAPR as compared to higher order modulation schemes. In addition, in some examples, such as the UE 502 configured in discontinuous (DTX) mode in a given symbol m, waveform generating component 510 can set d(m) to zero to indicate that no control data signal is present. In this example, waveform generating component 510 can generate the waveform to include the base sequence for the reference signal $r_{u1}(n)e^{j2\pi(\alpha 1)n/12}$ without a control data signal to indicate DTX feedback.

At Block 606, the UE 502 can transmit the waveform on one resource block in a symbol duration or TTI having a duration that is less than a subframe. In an aspect, communicating component 361, e.g., in conjunction with one or more processors 503 and/or memory 505, transceiver 506, etc., can transmit the waveform on one resource block in the symbol duration or TTI having the duration that is less than the subframe. As described, the symbol duration or TTI can be associated with a lower latency wireless technology (e.g., ULL LTE) and may include a single symbol TTI, or a two symbols TTI, or a slot TTI, etc., which can be similar to the TTIs in timelines 400, 402 in FIG. 4. Where the control data relates to HARQ feedback for downlink communications, in one example, communicating component 361 can transmit the waveform in the symbol duration or TTI that is a specified number of symbol durations or TTIs from a symbol duration or TTI on which the related downlink communications are received (e.g., 4 TTIs, as shown in FIG. 4). In an aspect, communicating component 361 can transmit the waveform based on resources assigned by the eNB 504 (e.g., as indicated in a uPDCCH) for communicating the control data signal (e.g., in uPUCCH resources).

Optionally, at Block 608, the UE 502 can transmit the waveform on a different resource block in a subsequent symbol duration or TTI, where the different resource block is of a different frequency than the resource block. In an aspect, communicating component 361, e.g., in conjunction with one or more processors 503 and/or memory 505, transceiver 506, etc., can transmit the waveform on the different resource block in the subsequent symbol duration or TTI, where the different resource block is of a different frequency than the resource block used in the prior TTI. This can provide frequency diversity for communicating the combined signal. In addition, it is to be appreciated that since communicating component 361 transmits the waveform on the different resource block in a subsequent symbol duration or TTI (e.g., an adjacent symbol duration or TTI than in the symbol duration or TTI duration in Block 606, such as symbol or TTI 5 in FIG. 4, where the original transmission of the combined signal waveform occurs in symbol or TTI 4 as ACK/NACK to data received in TTI 1) this can additionally provide time diversity for transmitting the control data.

FIG. 7 illustrates an example method 700 for decoding (e.g., by an eNB 504) control data from a combined signal including a reference signal and a control data signal. At Block 702, the eNB 504 can receive a first instance of signal from a device in one symbol or TTI and occupying a single resource block, where a duration of the symbol or TTI is less than a subframe. In an aspect, symbol processing component 302 (FIG. 5) can, e.g., in conjunction with one or more processors 553 and/or memory 555, transceiver 556, etc., receive the first instance of the signal from the device (e.g., UE 502) in one symbol or TTI, where the first instance of the signal occupies the single resource block, and where the duration of the symbol or TTI is less than a subframe. For example, symbol processing component 302 can receive the combined signal 580 from the UE 502 as a combined reference signal and control data signal, as described above. Accordingly, the combined signal can include the reference signal and control data signal phase offset from one another.

Optionally, at Block 704, eNB 504 may receive a second instance of the signal from the device in a subsequent symbol or TTI over a different resource block. In an aspect, symbol processing component 302 can, e.g., in conjunction with one or more processors 553 and/or memory 555, transceiver 556, etc., receive a second instance of the signal from the device (e.g., UE 502) in a subsequent symbol or TTI over a different resource block (relative to the resource block used by the first instance of the signal). As described, the subsequent symbol or TTI can be an adjacent symbol or TTI (e.g., symbol or TTI 5 in FIG. 4 where the first instance of the signal is transmitted on symbol or TTI 4). This can provide frequency diversity for communicating the signal.

At Block 706, eNB 504 can obtain a reference signal portion and a control data signal power from the first instance and/or the second instance of the signal, where the reference signal portion and the control data signal portion are phase offset from one another. In an aspect, reference signal obtaining component 520 can, e.g., in conjunction with one or more processors 553 and/or memory 555, etc., obtain the reference signal portion and the control data signal portion from the first instance of the signal (e.g., combined signal 580) and/or the second instance of the signal, where the reference signal portion and the control data signal portion are phase offset from one another. For instance, as described, the signal can include the reference signal generated from a base sequence and the control data signal as the base sequence, combined with control data, and at a different phase offset than the reference signal.

Accordingly, for example, symbol processing component 302 may obtain the reference signal portion and the control data signal portion by performing an IFFT, IDFT, etc. on the received signal, which can yield the reference signal and the control data signal separated in a time domain. Thus, reference signal obtaining component 520 can determine the reference signal base sequence from the signal based on measuring a first channel response in the time domain. Control data determining component 522 can then determine the control data from the control data signal based at least in part on the reference signal base sequence (e.g., by decoding the data represented in a second channel response in the time domain using the reference signal base sequence). In one example, control data determining component 522 can perform QPSK demodulation (e.g., or 16-QAM, etc.) of the control data signal based on the reference signal to determine the QPSK constellation (e.g., or 16-QAM constellation, etc.), and can then determine the control data based on the QPSK constellation (e.g., or 16-QAM, etc.). For example, control data determining component 522 can determine the control data at least in part by determining the bit(s) represented by the constellation.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
generating a waveform including a combined signal including a reference signal and control data signal, wherein the reference signal and the control data signal are phase offset from one another in the waveform; and
transmitting, over a transmission time interval (TTI) having a duration that is less than a subframe, the waveform including the combined signal on one resource block, wherein the duration of the TTI is of a two-symbol duration,
wherein transmitting the waveform comprises transmitting the waveform on a first symbol of the TTI, and transmitting the waveform on a different resource block in a second symbol of the TTI, wherein the different resource block is of a different frequency than the one resource block.

2. The method of claim 1, wherein generating the waveform comprises combining the reference signal as a base sequence with the control data signal, wherein the control data signal comprises the base sequence combined with control data.

3. The method of claim 2, wherein the control data is modulated using a quadrature phase shift keying (QPSK) constellation or a 16-quadrature amplitude modulation (QAM) constellation.

4. The method of claim 3, wherein the QPSK constellation or the 16-QAM constellation is selected to decrease a peak-to-average power ratio (PAPR) of the waveform.

5. The method of claim 3, further comprising setting the QPSK constellation or the 16-QAM constellation to zero to indicate feedback of discontinuous transmission (DTX) in the control data.

6. The method of claim 1, wherein the phase offset comprises a first phase offset for the reference signal, and a second phase offset for the control data signal, wherein the first phase offset is different from the second phase offset.

7. The method of claim 1, wherein the control data signal includes hybrid automatic repeat/request (HARQ) feedback.

8. A user equipment for wireless communication, comprising:
a transceiver;
at least one processor communicatively coupled with the transceiver via a bus; and
a memory communicatively coupled with the at least one processor and/or the transceiver via the bus;
wherein the at least one processor is configured to:
generate a waveform including a combined signal including a reference signal and control data signal, wherein the reference signal and the control data signal are phase offset from one another in the waveform; and transmit, via the transceiver over a transmission time interval (TTI) having a duration that is less than a subframe, the waveform including the combined signal on one resource block, wherein the duration of the TTI is of a two-symbol duration, wherein the at least one processor is configured to transmit the waveform on a first symbol of the TTI, and transmit the waveform on a different resource block in a second symbol of the TTI, wherein the different resource block is of a different frequency than the one resource block.

9. The user equipment of claim 8, wherein the at least one processor is further configured to generate the waveform at least in part by combining the reference signal as a base sequence with the control data signal, wherein the control data signal comprises the base sequence combined with control data.

10. The user equipment of claim 9, wherein the control data is modulated using a quadrature phase shift keying (QPSK) constellation or a 16-quadrature amplitude modulation (QAM) constellation.

11. The user equipment of claim 10, wherein the QPSK constellation or the 16-QAM constellation is selected to decrease a peak-to-average power ratio (PAPR) of the waveform.

12. The user equipment of claim 10, the at least one processor is further configured to set the QPSK constellation or the 16-QAM constellation to zero to indicate feedback of discontinuous transmission (DTX) in the control data.

13. The user equipment of claim 8, wherein the phase offset comprises a first phase offset for the reference signal, and a second phase offset for the control data signal, wherein the first phase offset is different from the second phase offset.

14. The user equipment of claim 8, wherein the control data signal includes hybrid automatic repeat/request (HARQ) feedback.

15. A user equipment for communications, comprising:
means for generating a waveform including a combined signal including a reference signal and control data signal, wherein the reference signal and the control data signal are phase offset from one another in the waveform; and means for transmitting, over a transmission time interval (TTI) having a duration that is less than a subframe, the waveform including the combined signal on one resource block, wherein the duration of the TTI is of a two-symbol duration, wherein the means for transmitting the waveform transmits the waveform on a first symbol of the TTI, and transmits the waveform on a different resource block in a second symbol of the TTI, wherein the different resource block is of a different frequency than the one resource block.

16. The user equipment of claim 15, wherein the means for generating the waveform is further configured to combine the reference signal as a base sequence with the control data signal, wherein the control data signal comprises the base sequence combined with control data.

17. The user equipment of claim 16, wherein the control data is modulated using a quadrature phase shift keying (QPSK) constellation or a 16-quadrature amplitude modulation (QAM) constellation.

18. The user equipment of claim 17, wherein the QPSK constellation or the 16-QAM constellation is selected to decrease a peak-to-average power ratio (PAPR) of the waveform.

19. The user equipment of claim 17, further comprising means for setting the QPSK constellation or the 16-QAM constellation to zero to indicate feedback of discontinuous transmission (DTX) in the control data.

20. The user equipment of claim 15, wherein the phase offset comprises a first phase offset for the reference signal, and a second phase offset for the control data signal, wherein the first phase offset is different from the second phase offset.

21. A non-transitory computer-readable storage medium comprising computer-executable code, comprising code to:
generate a waveform including a combined signal including a reference signal and control data signal, wherein the reference signal and the control data signal are phase offset from one another in the waveform; and transmit, over a transmission time interval (TTI) having a duration that is less than a subframe, the waveform including the combined signal on one resource block, wherein the duration of the TTI is of a two-symbol duration, wherein the code to transmit the waveform transmits the waveform on a first symbol of the TTI, and transmits the waveform on a different resource block in a second symbol of the TTI, wherein the different resource block is of a different frequency than the one resource block.

22. The non-transitory computer-readable storage medium of claim 21, wherein the code further combines the reference signal as a base sequence with the control data signal, wherein the control data signal comprises the base sequence combined with control data.

23. The non-transitory computer-readable storage medium of claim 22, wherein the control data is modulated using a quadrature phase shift keying (QPSK) constellation or a 16-quadrature amplitude modulation (QAM) constellation.

24. The non-transitory computer-readable storage medium of claim 23, wherein the QPSK constellation or the 16-QAM constellation is selected to decrease a peak-to-average power ratio (PAPR) of the waveform.

25. The non-transitory computer-readable storage medium of claim 23, the code further configured to set the QPSK constellation or the 16-QAM constellation to zero to indicate feedback of discontinuous transmission (DTX) in the control data.

26. The non-transitory computer-readable storage medium of claim 21, wherein the phase offset comprises a first phase offset for the reference signal, and a second phase offset for the control data signal, wherein the first phase offset is different from the second phase offset.

* * * * *